(12) United States Patent
Zervens et al.

(10) Patent No.: US 6,223,259 B1
(45) Date of Patent: Apr. 24, 2001

(54) REDUCING READ CYCLE OF MEMORY READ REQUEST FOR DATA TO BE PARTIALLY MODIFIED BY A PENDING WRITE REQUEST

(75) Inventors: Matiss Jonas Zervens, Järfälla; Orvar Per Dahl, Stockholm, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/182,773

(22) Filed: Oct. 30, 1998

(51) Int. Cl.[7] ................................................ G06F 12/00
(52) U.S. Cl. .............................. 711/141; 710/5; 711/155
(58) Field of Search ............................ 710/5; 711/141, 711/155

(56) References Cited

U.S. PATENT DOCUMENTS

| | | | |
|---|---|---|---|
| 4,467,414 | 8/1984 | Akagi et al. | |
| 5,379,379 | * 1/1995 | Becker et al. | 711/3 |
| 5,459,842 | * 10/1995 | Begun et al. | 711/155 |
| 5,465,336 | 11/1995 | Imai et al. | |
| 5,870,625 | * 2/1999 | Chan et al. | 710/5 |

FOREIGN PATENT DOCUMENTS

| | | |
|---|---|---|
| 0651323 | 5/1995 | (EP) . |
| 2489021 | 2/1982 | (FR) . |
| WO9727538 | 7/1997 | (WO) . |

* cited by examiner

*Primary Examiner*—Kenneth S. Kim
(74) *Attorney, Agent, or Firm*—Burns, Doane, Swecker & Mathis, L.L.P.

(57) ABSTRACT

In a computer system, the number of memory cycles for reading data is reduced. Read requests for data from a memory location are received at a data storage controller. A determination is made as to whether a read request is dependent on a pending write request that modifies the memory location. If so, a memory cycle is executed that initiates a read cycle for reading the data at the memory location, modifies the read data according to the pending write request, and initiates a write cycle that writes the modified data into the memory location. Then, the dependent read request is serviced, without initiating another read cycle, by returning the modified data to the memory controller prior to initiating the write cycle.

6 Claims, 3 Drawing Sheets

REDUCING READ CYCLE OF MEMORY READ REQUEST FOR DATA TO BE PARTIALLY MODIFIED BY A PENDING WRITE REQUEST

TECHNICAL FIELD

The invention generally relates to the field of computer systems and more particularly to reducing memory cycles generated for reading data from system memory.

BACKGROUND

Under a typical computer system architecture, a memory controller controls access to system memory during read and write cycles. When accessing the system memory, the memory controller processes read and write requests generated by a central processor unit (CPU), requesting data read from or written into a particular memory address. Upon receipt of the CPU requests, the memory controller initiates corresponding read or write cycles over a system bus, for accessing the addressed memory locations. The amount of data transferred during each memory cycle is dependent on the width of the system's data bus and the length of a memory location, which is defined in terms of data bits, for example, 8-bit, 16-bit, or 32-bit.

Because the performance of a computer system is highly dependent on the data throughput between the system memory and the CPU, various techniques have been devised to increase such throughput. These techniques include pipelining and pre-fetching of CPU instructions. For pre-fetching of the CPU instructions, newly arrived instructions are fetched prior to the execution of a previous instruction, thereby increasing execution efficiency. Under pipelining, the CPU instructions are subdivided into smaller sub-tasks, with each sub-task being performed by a corresponding register. For executing an ADD instruction, for example, the ADD instruction must be fetched from the system memory, decoded by an instruction decoder, and processed in an ALU. In order to execute multiple ADD instructions in a pipelined manner, corresponding registers separately perform the fetching function, decoding function and ALU function, thereby performing multiple ADD functions substantially simultaneously.

In computer systems that employ pipeline and pre-fetch execution techniques, situation arises when a read request becomes dependent on a still pending and un-executed write request. This dependency does not pose complications in systems that utilize write priority over the read request. However, in some computer systems, for example, those used in telephony applications where system performance is measured by how fast data can be read from the system memory, read requests have priority over write requests.

Generally, data is read from and written into the system memory in full length (for example, 8-, 16-, or 32-bits). This is true even if a read request or a write request is for partial data that is less than the full length, for instance, when the write request modifies one byte of a 4 byte memory location. Because reads and write cycles are performed on the entire length of the memory locations, conventional systems use a read-modify-write (RMW) cycle to handle such request. Under a RMW cycle, the memory controller reads the entire memory location and partially modifies the data portion specified by the write request, and writes the modified data back into the specified location.

In systems that provide for read priority, a read request may be dependent on a pending un-executed write request that is queued in a path separate from the read request. For resolving the dependency, the memory controller must wait until the write request is executed, before servicing the read request. In some instances, however, the resolution of the dependency may require the execution of a RMW cycle. For example, a read request requiring the reading of a full length of a 32-bit (i.e. 4-bytes) memory location may be dependent on a pending RMW cycle that partially modifies, e.g., one byte, of the same memory location. When the resolution of the dependency requires the execution of a RMW cycle, conventional techniques for servicing the read request must execute two read cycles: one for reading the data before write modification and the other for reading of the data after the write modification.

It is, however, desirable to reduce the number of read cycles in computer systems that resolve dependencies so as to increase data throughput of the system.

SUMMARY OF THE INVENTION

Briefly, according the present invention a method for reading data from a computer system memory receives read requests for data from a memory location at a data storage controller. A determination is made as to whether a read request is dependent on a pending write request that modifies the memory location. If so, a memory cycle is executed that initiates a read cycle for reading data at the memory location, modifies the read data according to the pending write request, and initiates a write cycle that writes the modified data into the memory location. The dependent read request is serviced, without initiating another read cycle, by returning the modified data to the memory controller prior to initiating the write cycle.

According to some of the more detailed features of the invention, the read requests have priority over the pending write requests and the memory cycle is a forced cycle that is executed prior to servicing subsequently received read requests, with the pending write request partially modifying the memory location. Preferably, the method of the invention services those pending write requests that partially modify data in memory locations without causing read request dependency by initiating a read-modify-write cycle.

DETAILED DESCRIPTION OF THE PREFERRED EMBODIMENT

Figure 1:
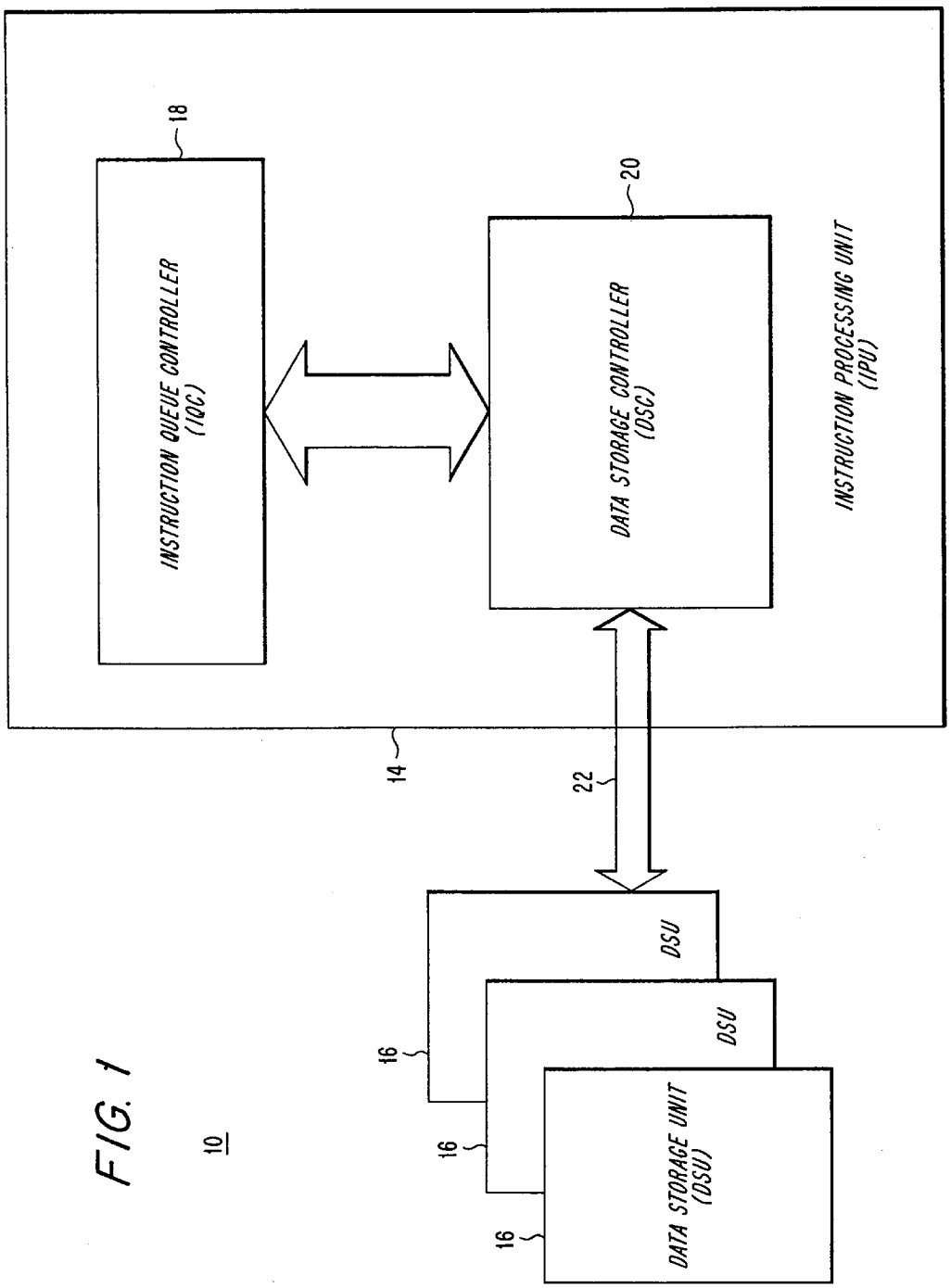
FIG. 1 is a block diagram of a computer system that advantageously incorporates the present invention.

Referring to FIG. 1, a block diagram of a computer system 10 that advantageously incorporates the present invention is shown. In the exemplary embodiment, the computer system 10 is a telephony computer system providing switching control for a public system telephone network (PSTN). In order to provide the required telephony services, the computer system 10 is designed as a read priority system, where the read requests have priority over the write requests. The system 10 operates under the control of an Instruction Processor Unit (IPU) 14 that exchanges data stored in a plurality of interleaved Data Storage Units (DSU) 16 by executing a program that generates memory access requests, including read requests and write requests. A read request requests data variables or sub-variables from a specified memory location, and a write request modifies data variables or sub-variables in the same memory location.

In the exemplary embodiment of the invention, each memory location stores 32 bits (i.e. 4 bytes) of data that are addressable by a 32-bit address. Preferably, the interleaved arrangement of the DSUs 16 allows for data access to one DSU to start, while an access to another DSU is continuing. An Instruction Que Controller (IQC) 18 within the IPU 14 is responsible for sequencing the requests and providing them to a Data Storage Handler (DSC) 20. The DSC 20 is responsible for generating memory cycles over a memory bus 22. As described above, the system 10 employs pipe-lining and pre-fetching techniques for executing the IPU instructions.

Figure 2:
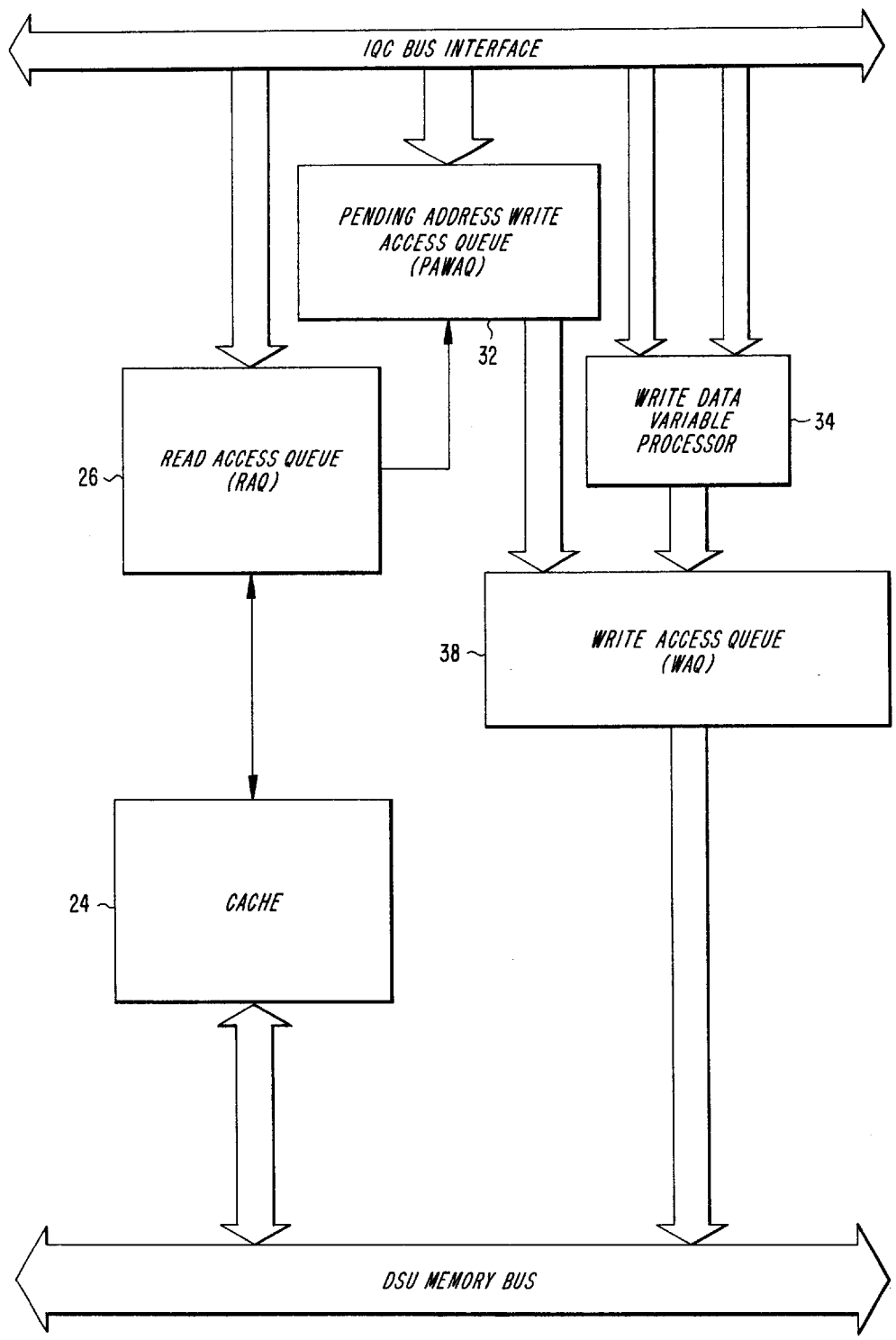
FIG. 2 is a block diagram of a data storage controller that is incorporated in the computer system of FIG. 1.

Referring to FIG. 2, a block diagram of the DSC 20 of the present invention is shown. For queuing the read requests, the DSC 20 includes a multiple-element Read Access Queue (RAQ) 26 that stores IQC-generated read requests for reading data variables from specified DSU memory locations. The IQC 18 may also flush the RAQ 26, clearing some or all of its elements. Preferably, the IQC 18 has an internal buffer (not shown) that is of equal length to the RAQ 26, to prevent it from becoming full. In the exemplary embodiment, the RAQ 26 is an 8-element queue with each element having 46 bits as defined by Table 1 below.

TABLE 1

| Content of RAQ | | | | |
|---|---|---|---|---|
| 45 | 44 | 43–48 | 37–6 | 4–0 |
| PV | MV | MTAG | Address | Tag |

PV is a position valid flag that indicates whether a RAQ element is valid or not. For example, when a read request is flushed, PV is reset. Tag is an access sequence number assigned by the IQC 18 to each read request. Address specifies the memory location from which a data variable or sub-variable to be read. As mentioned above, in the computer system 10, the read requests have the highest priority and usually 'pass through' the RAQ 26 unimpeded, unless one becomes dependent on a pending write request. For each one of the read requests arriving from the RAQ 26, a determination is made as to whether the requested data is dependent on a pending write request. When a read request becomes dependent on a pending write request, the pending write request is given priority by execution of a forced cycle. MTAG is a match tag assigned to each write request and is returned to a corresponding RAQ element, when a read request becomes dependent on a pending write request. Under this condition, which is indicated by MTAG and MTAG valid (MV) flag, the forced write cycle is started to write the data associated with the pending write request into the DSU 16.

As described later in detail, when the read request is dependent on a write request that partially modifies a memory location, the modified data, in addition to being written into the DSU 16, is returned to the DSC 20 by generating a READ-MODIFY-READ-WRITE (RMRW) cycle. When the RMRW cycle is generated, the returned data to the DSC 20 is stored into a cache memory 24, which in the exemplary embodiment of the present invention, has 16 positions. When the forced write cycle is started, a position in the cache memory 24 is reserved by storing the position to which the modified data of the pending write request is to be returned.

For queuing the write requests, the DSC 20 includes an 8-element Pending Address to Write Access Queue (PAWAQ) 32. Although in strict order, data variables to be modified may arrive at the DSC 20 concurrently with or after write addresses have arrived at the PAWAQ 32. A write data variable processor 34 processes the arrived data variables at which time an associated address with the arrived data variable is taken out of the PAWAQ 32 and placed in a Write Access Queue (WAQ) 38. Preferably, the PAWAQ 32 is the same size as an IQC buffer (not shown) that supplies the write requests to prevent queue overflow. It should be noted that the IQC 18 may flush a pending write request in the PAWAQ 32 prior to arrival of its associated data variable. In the shown embodiment, each element of the PAWAQ 32 has 56 bits, which are defined according to Table 1 below.

TABLE 2

| PAWAQ 32 queue contents | | | | | | | |
|---|---|---|---|---|---|---|---|
| 55–50 | 49 | 48 | 47 | 46–39 | 38–7 | 6–5 | 4–0 |
| PTag | PV | PF | DW | VC | Address | PT | Tag |

Tag flag is received from the IQC 18 defining a write access sequence number. Address is a write address to a memory location received from the IQC 18 for a corresponding write request sequence number. PTag and PT are internal panic tags in the DSC 20 used for resolving situations when the same tag is in two positions in the access sequences. In the exemplary embodiment, the data variables received from the IQC 18 may have one of the following bit length formats: 1-bit data, 2-bit data, 4-bit data, 8-bit data, 16-bit data, 32-bit data, 64-bit data and 128-bit data format. The bit length format and data start position is specified by the IQC 18 via a VC flag. In the exemplary embodiment, the IQC 18 fragments 64-bit and 128-bit data into 2 or 4 32-bit data, respectively, and the DSC 20 handles each 32-bit data transparently. Double-write (DW) flag indicates a condition when an instruction writes the same data to two different memory locations.

The WAQ 38 queues the arrived data variables and their associated address. In the exemplary embodiment, the write requests are written out to a DSU 16 only when the memory bus 22 is idle, the WAQ queue 38 is full, or a read request is dependent on a pending write requests. The dependency of a read request on a pending write request is determined by comparing the queued write addresses in the PAWAQ 32 and WAQ 38 and the address associated with an arriving read request in the RAQ 26. A Pending Read Flag set by a dependent read in the RAQ 26 is used to force write cycles when a read request becomes dependent on a pending write request.

According to this invention, when a read request becomes dependent on a pending write request that partially modifies a memory location, the DSC 20 generates the RMRW cycle, for resolving the dependency of the read request. Under the RMRW cycle, a read cycle is executed and after write modification, the modified data is returned both to the DSC 20 and written back to the DSU 16 in parallel, i.e., substantially concurrently. More specifically the returned data to the DSC 20 is stored in the cache position reserved when the dependency of the read request is determined. As such, the RMRW cycle requires the execution of only one read cycle, since the modified data is returned concurrent with the subsequent write back to the memory. In this way, the number of read cycles over the memory bus is reduced to one. However, the DSC 20 generates a RMW cycle to service write requests that do not cause dependency for a read request. For example, when servicing write requests that partially modify a memory location if the memory bus 22 is idle or the WAQ queue 38 is full, the DSC 20 generates a RMW cycle.

Figure 3:
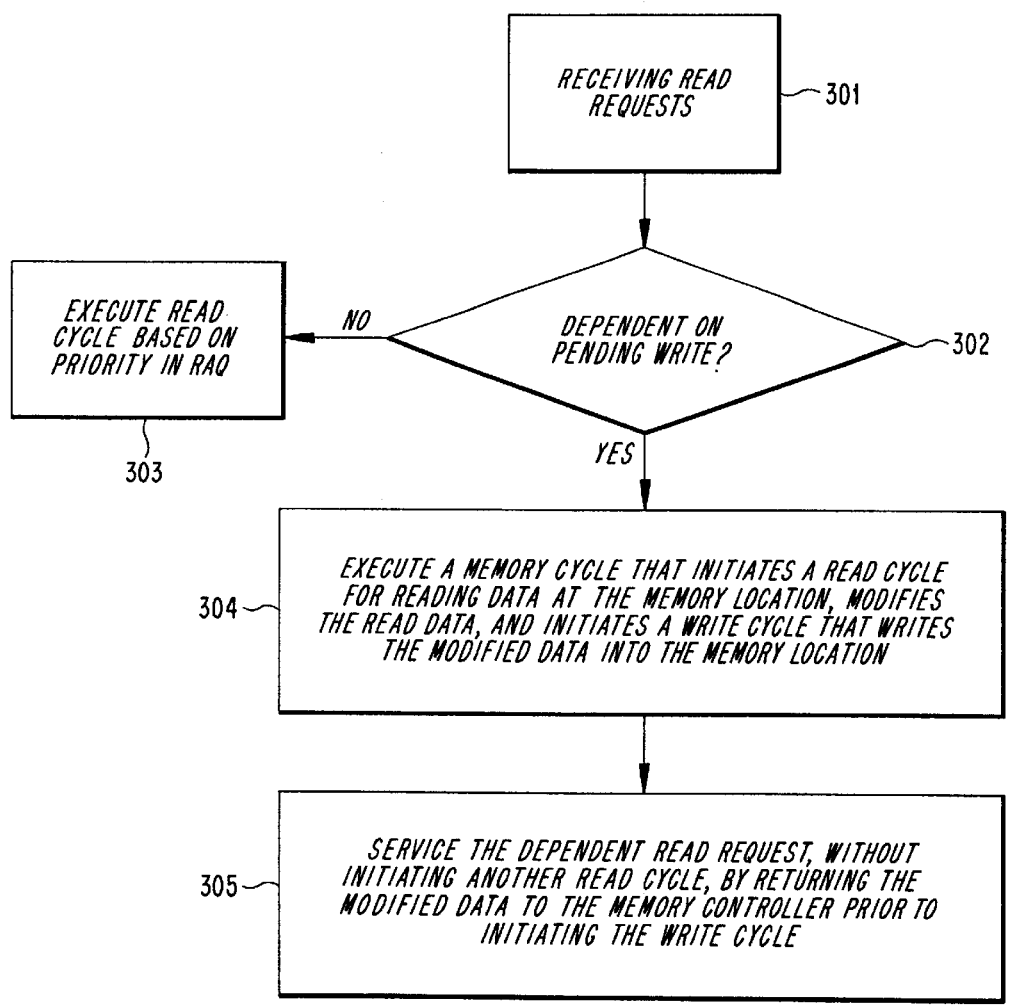
FIG. 3 is a flow chart of steps taken for reading data from a computer system memory according to the present invention.

Referring to FIG. 3, a flow chart of a method for accessing memory according to the present invention is shown. According to the flow chart, the method includes receiving a read request initiated by the IPU 14, block 301. Then, a determination is made as to whether the read request is dependent on a pending write request that modifies a memory location, block 302. If not dependent, the read cycle is executed based on priority in the RAQ 26, block 303. Otherwise, the pending write request is executed prior to servicing the read request by initiating a RMRW cycle that initiates a read cycle for reading data at the memory location, modifies the read data based on the pending write request, and initiates a write cycle that writes the modified data into the memory location, block 304. The dependent read request is serviced, without initiating another read cycle, by returning the modified data to the DSC 20 prior to initiating the write cycle, block 305. As explained above, those pending write requests that partially modify data in memory locations, without causing read request dependency, are serviced by initiating a read-modify-write cycle.

From the foregoing description it would be appreciated that the present invention reduces both the number of read cycles needed to handle read requests that become dependent on writes that partially modify a memory location.

What is claimed is:

1. A method for reading data from a system memory, comprising the steps of:

receiving read requests for data from a memory location at a data storage controller;

determining whether a read request is dependent on a pending write request that writes data that modifies the memory location;

if so, executing a memory cycle that initiates a read cycle for reading data at the memory location, modifies the read data based on the pending write request, and initiates a write cycle that writes the modified data into the memory location; and serving the read request dependent on the pending write request, without initiating another read cycle.

2. The method of claim 1, wherein the step of servicing the read request includes the step of returning the modified data to the memory controller prior to initiating the write cycle.

3. The method of claim 1, wherein the memory cycle is a forced cycle executed prior to servicing subsequently received read requests.

4. The method of claim 1, wherein the pending write request partially modifies the memory location.

5. The method of claim 1, wherein unless dependent, the read requests have priority over the pending write requests.

6. The method of claim 1 further including the step of servicing those pending write requests that partially modify data in memory locations without causing read request dependency by initiating a read-modify-write cycle.

* * * * *